March 18, 1930. E. A. HOBART 1,750,713
VOLTAGE REGULATION WINDING FOR ELECTRIC GENERATORS
Filed June 18, 1923 3 Sheets-Sheet 1

Edward A. Hobart INVENTOR.

March 18, 1930. E. A. HOBART 1,750,713
VOLTAGE REGULATION WINDING FOR ELECTRIC GENERATORS
Filed June 18, 1923 3 Sheets-Sheet 2

Edward A. Hobart
INVENTOR.

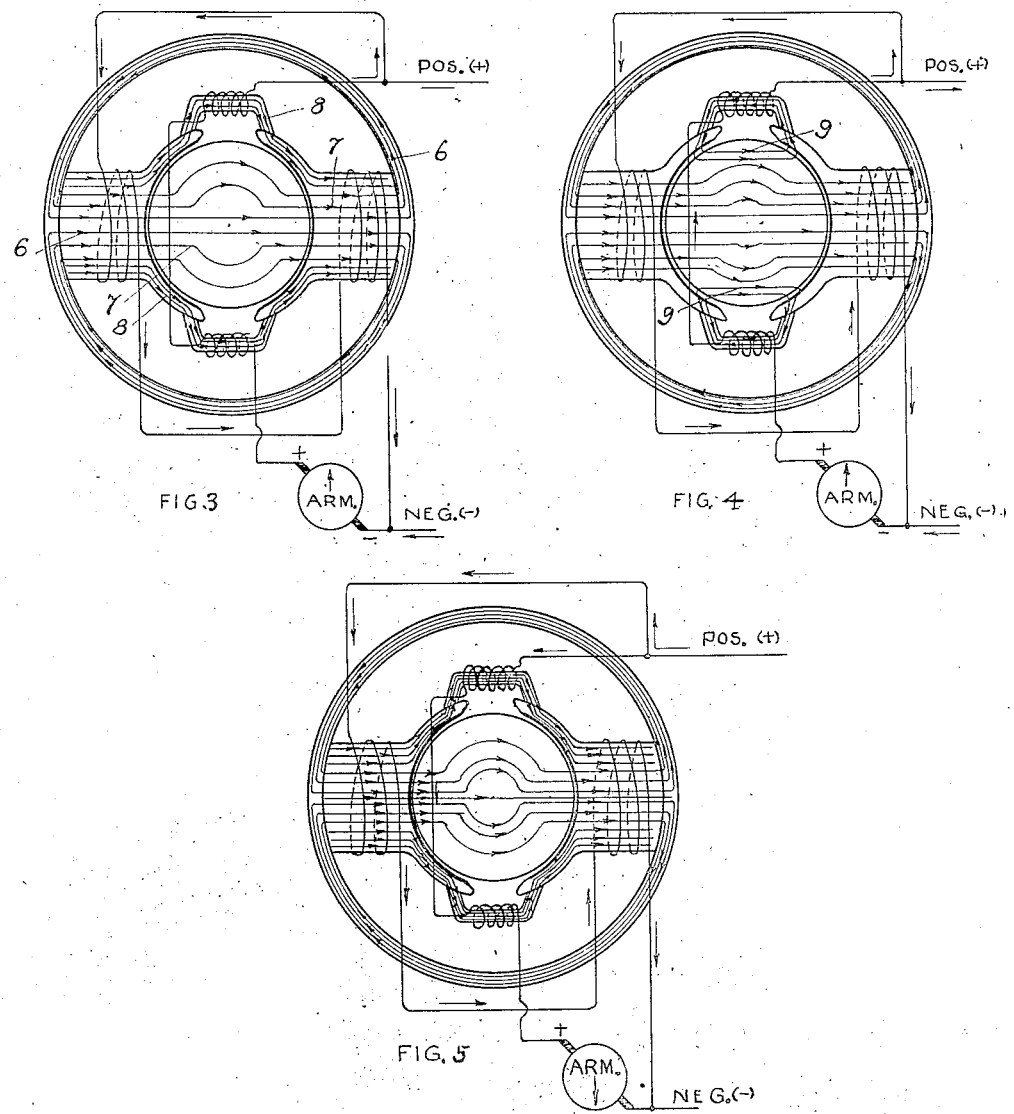

Patented Mar. 18, 1930

1,750,713

UNITED STATES PATENT OFFICE

EDWARD A. HOBART, OF TROY, OHIO

VOLTAGE-REGULATION WINDING FOR ELECTRIC GENERATORS

Application filed June 18, 1923. Serial No. 646,109.

My invention relates to the voltage regulation of electric generators and is more especially designed for machines used for charging storage batteries. In such machines it is required that the voltage of the machine be held at a constant value irrespective of the load on the machine. It is known that a storage battery can be charged in the best and most rapid way if given a tapering charge, starting at a high rate and tapering off to a very low rate. Furthermore, the storage battery itself will regulate its own charging rate, if connected to a constant voltage supply line, which voltage is held at a value equal to the voltage finally attained by the battery when fully charged. For a lead battery, this voltage is approximately 2½ volts per cell or 7½ volts for a standard 3 cell battery.

By providing a machine which delivers a constant voltage of 7½ volts irrespective of its load, batteries can be given a tapering charge from the machine which will vary from 50 to 60 amperes on the start, when the battery itself has an opposing voltage of 6 volts, to only 5 or 6 amperes when the opposing voltage of the battery rises to the equal of the machine voltage or 7½ volts.

A standard shunt wound generator is not suitable for this work because its voltage changes too much from no load to full load. A standard compound wound generator meets the requirements as to voltage regulation but is open to the one very serious objection that the compound winding will reverse the polarity of the generator, if current flows back from the batteries into the machine. The compounding, in this case, overcomes the shunt winding, reversing the polarity, puts practically a dead short circuit on the batteries, speeds up the armature in the reverse direction to an enormous speed and generally results in damage to the machine and batteries.

The object of my invention is to provide a winding that will hold the voltage of the machine constant, and at the same time, will not reverse the polarity of the machine, if the battery current flows back into the generator.

A more particular purpose of the invention is to provide a direct current generator that will maintain a substantially constant voltage at its terminals and which is effectually protected against injury in the event of failure of power from the motor that drives the generator, or a decrease in the generator voltage below that of the line to which it is connected.

A further object of my improvement is to automatically increase the field strength of the generator as the load on the generator increases, by a mechanism that positively prevents a reversal of the magnetism in the field, in the event of reversal of current in the main generator circuit.

Another purpose of the invention is to provide for increases in the generator field strength as the load increases, while preventing decreasing the field strength beyond a predetermined fixed point, that is, but slightly below normal, so that no substantial decrease in field strength takes place if the generator should run as a motor supplied by current from the battery being charged, or other source.

The invention has for its object to afford a magnetic by-pass or diverting instrumentality extending from each pole piece partially around and hence toward the frame, and to control said by-pass from the main generator circuit in such a way as to vary the amount of leakage therethrough, causing more magnetism to pass through the armature as the load is increased, the by-pass being constructed and arranged so as to cause the generator to operate at a safe speed when operating as a motor.

There are numerous ways in which the features of my improvement can be carried out, and for the purpose of illustration of one example of a practical mechanism, I have disclosed a direct current generator such as used for a storage battery charging outfit.

The generation of current in such a generator depends upon the passing of magnetic lines of force between the pole pieces through the armature, and in my invention is based upon the discovery that these magnetic lines of force may be partially diverted around the armature instead of passing through it, and the extent of such amount of such diversion of magnetism can be controlled automatically so as to increase the magnetism passing through the armature as the load increases, and decrease as the load decreases.

I have illustrated my windings in connection with a bipolar machine in which:

Figure 3 is a diagrammatic view showing the path of the flux at no load for the one form of machine.

Figure 4 is a similar view showing the path of the flux at full load.

Figure 5 is a similar view showing the action of the coil when current flows back through it from the battery into the machine.

Figure 1:
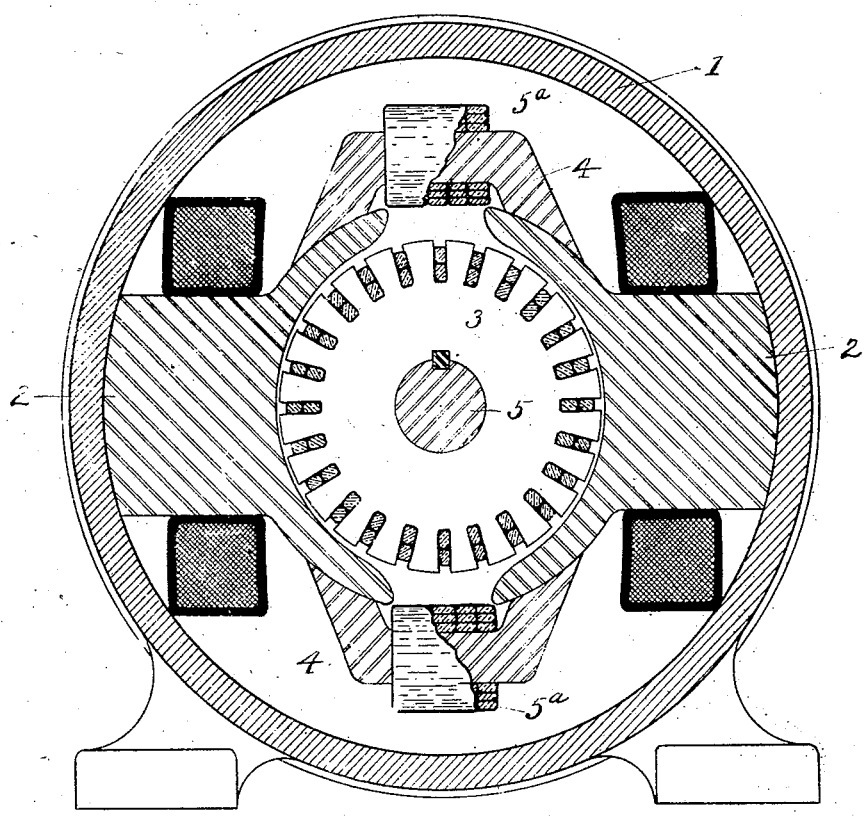
Figure 1 is a central cross section of such bipolar machine with the coils in place as designed for magnetic leakage across between the pole tips.
Figure 2:
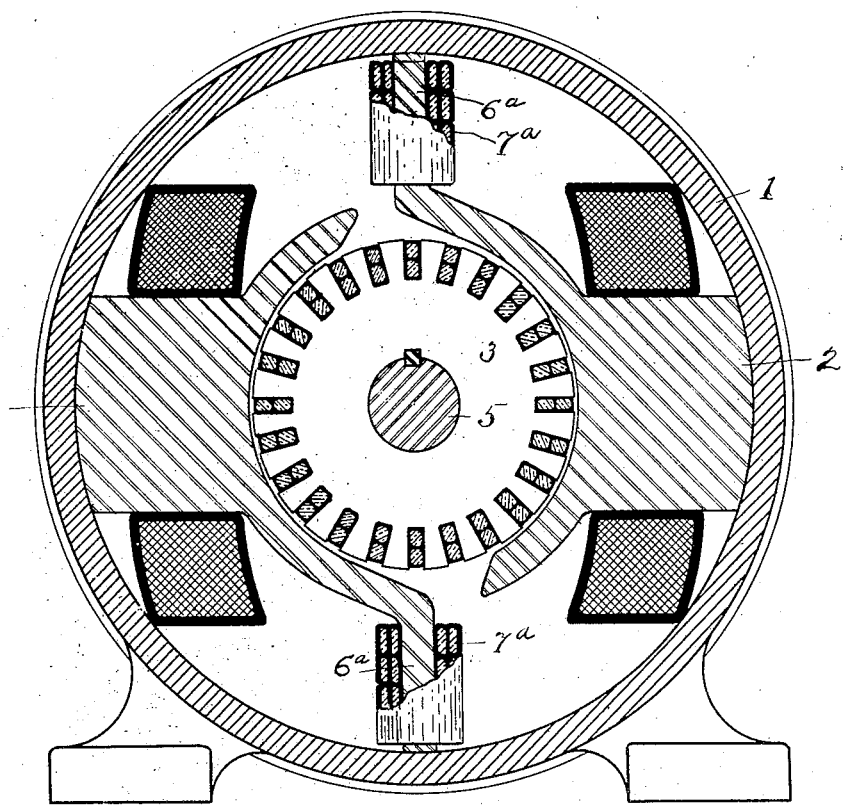
Figure 2 is a similar cross section designed for magnetic leakage from the pole tips to the field yoke, instead of between the adjacent pole tips.

In Figures 1 and 2 the generator yoke is indicated at 1 with two pole pieces 2, 2, and armature 3 on shaft 5. Between the pole pieces at each side in the construction illustrated in Figure 1, steel cores 4, 4 are mounted which constitute a magnetic path of steel around the armature, serving as a leakage path for the main flux and thus reducing the voltage of the machine at no load. Around these steel cores is wrapped a coil of wire 5ª in series with the main current through the armature.

The windings of this series coil are in such direction that the effect is to dampen or oppose the flux which leaks through the leakage path and causes the leakage flux to take its proper path through the armature, thus raising the voltage of the machine. Not only does this series coil dampen out the leakage flux but it may be made strong enough so that it actually adds to the main flux by providing an additional flux of its own, which also raises the voltage.

It can be seen that the strength of this series coil depends upon the load on the machine, being maximum at full load and zero at no load, which is the condition desired. At no load, when the voltage tends to be highest, the series coil has no effect, for there is no current flowing through it. At this time, the leakage flux is maximum and tends to reduce the armature voltage. At full load, the series coil dampens out the leakage and provides additional armature flux, thus raising the voltage in the armature to take care of resistance and load losses. The net result is that the line voltage remains constant between no load and full load.

In the construction shown in Figure 2 the pole tips are projected outwardly at 6ª to the field yoke and the coils 7ª are wound on these projections to affect the leakage from the poles to the yoke.

The effect of the magnetic steel cores and the windings can be understood from an examination of the diagrams.

In Figure 3, which shows the condition at no load with no current flowing through the series coil, it will be noted that the flux, indicated by arrows 6, divides itself into two paths, one 7 flowing through the armature and the other 8 through the core.

In Figure 4, we have the conditions at full load with full current flowing through the series coil. The effect of this current is to reverse the direction of the flux shown by arrows 9 in the leakage path and to send it through the armature to assist the main flux in maintaining the full voltage.

In Figure 5 when the current flows back through the coil from the battery into the machine, the effect is to provide a flux which works with the leakage flux instead of against it. It tends to increase the leakage flux past the armature and follows the remainder of its path through the pole pieces, choosing an all metallic path rather than cutting back through the armature as such path has two air gaps in it.

It is impossible for this coil to reverse the main flux and subsequently, the polarity of the machine, first, because current from the batteries flowing through the coil acts upon a path which is already saturated with flux and which can be made only slightly denser by the current in the series coils; and, secondly, because flux produced by this series winding acts upon a leakage path and not upon the main flux path through the armature and whatever additional flux is produced by the series coil in making its complete circuit returns through the poles and yoke, which path is all metallic, rather than through the armature which path has a much higher resistance due to two air gaps in it.

It will be obvious that this construction of regulating coil can be applied to a multipolar machine as well as a bipolar and that instead of two regulating coils only one coil can be employed with twice the number of turns in the one coil. Also in a four pole machine two coils could be used instead of a coil for each pole, locating them opposite each other.

Preferably, the pole tip hereinafter referred to as the diverter pole is so designed that the amount of magnetism diverted by it at no load is such that when re-directed through the armature upon increased load, it will cause the generated voltage to equal the terminal voltage plus the internal voltage drop.

The cross section and arrangement of the diverter pole is such that when the generator is operating normally with no load, considerable magnetism is passing through the diverter pole and the latter is near its point of saturation. Therefore very little additional magnetism need be diverted to bring it to complete saturation, after which the diverter pole will divert substantially no additional magnetism from its path to the armature. The amount of magnetism passing through the diverter poles can be very considerably reduced, however, in order to strengthen the main field upon increasing load conditions, and the reasons for these conditions will now be explained.

If the generator speed is decreased, owing to a change in speed or entire failure of the motor which drives the generator, the generator voltage drops proportionately, and this drop is sometimes such as to result in the generator voltage being lower than that of the battery being charged, whereupon the latter drives the generator as a motor.

Under these conditions, the current in the main generator circuit is reversed, and it is essential that this shall not have the effect of substantially weakening the magnetism in the main field to the point of permitting the armature to turn at an excessive speed. With the construction described above, the diverter pole prevents the main magnetic field strength from being substantially decreased when the main current reverses, since a portion of the diverter pole quickly reaches a point of complete saturation, after which practically no further leakage occurs, irrespective of the amount of current in the diverter pole coil.

Under these conditions, the main magnetic field strength is held at such a point as to cause the generator to run as a motor without excessive speed and without doing any injury. As soon as the generator driving motor resumes operations, or returns to normal speed, the generator voltage increases to a point above that of the battery, and again functions normally. While charging, a practically constant voltage at the generator terminals is assured, because as the generated current increases, the amount of magnetism passing through the diverter poles is decreased, and that passing to the armature correspondingly increased, so that the field strength is increased proportionately to an increase of current in the main generator circuit.

The basic principle of this invention is, namely, that a leakage path or diverter path is provided which allows the main flux from the main pole to be partly diverted or leak through a path which does not go through the armature. This path is made small so that due to the limited amount of metal in it, only a small portion of the main flux can leak through it at no load bringing the density of the flux in this path up to a high point at no load.

When a load comes on the machine, current through a series coil which is wrapped around this leakage path opposes its leakage and prevents a part of the flux from leaking past this path and makes it take a path through the armature where it does effective work in raising the voltage of the machine so that it will compensate for the resistance and other drops in the circuit.

When my improved generator is called upon to operate as a motor from the batteries the current flows through the series coil in the opposite direction but due to the fact that the series coil is wrapped on a small diverter or leakage path, instead of on the main pole piece it cannot totally reverse the magnetism of the main field to the point where reversal occurs to cause the generator to speed up and ruin itself.

Having thus described my invention, what I claim as new and desire to secure by Letters Patent, is:—

1. A generator comprising a field including a frame and pole pieces, an armature, diverting means arranged to divert magnetism from the pole pieces around the armature instead of through it, and means acting automatically to vary the amount of magnetism so diverted in accordance with changes in the amount of generated current, said diverting means being so constructed that there is no substantial increase in diverted magnetism and no substantial decrease in the main field strength upon reversal of current when the generator acts as a motor, whereby the generator may safely operate as a motor without excessive speed.

2. A generator comprising a field including a frame and pole pieces, an armature, diverting means arranged to divert magnetism from the pole pieces around the armature instead of through it, and current controlled means acting to vary the amount of magnetism so diverted, said diverting means being so constructed that there is no substantial increase in diverted magnetism and no substantial decrease in the main field strength upon reversal of current when the generator acts as a motor, whereby the generator may safely operate as a motor without excessive speed.

3. A generator comprising a field including a frame and pole pieces, an armature, diverting means arranged to divert magnetism from the pole pieces around the armature instead of through it, and a main circuit cooperating directly with said diverting means and acting to vary its reluctance in accordance with changes in the amount of generated current, said diverting means being so constructed that there is no substantial increase in diverted magnetism and no substantial decrease in the main field strength upon reversal of current when the generator acts as a motor, whereby the generator may safely operate as a motor without excessive speed.

4. A generator comprising magnetism diverting means controlled by the generated current for increasing the field strength proportionately to the increase in current and preventing substantial reduction in the magnetism in the main field upon reversal of current in the main line whereby the generator may operate as a motor without excessive speed.

5. A generator comprising a field including a frame and pole pieces, an armature, a magnetic by-pass extending partially around the armature from the inner end of each pole piece to a spaced point on the frame, and current controlled means for varying the reluctance of said by-pass.

6. A generator comprising a field including a frame and pole pieces, an armature, a magnetic by-pass extending partially around the armature from the inner end of each pole piece to a spaced point on the frame, and current controlled means acting upon said by-pass to increase the main field strength proportionately to an increase in current, said by-pass being magnetically saturated whereby a substantial decrease in the main field strength is prevented upon reversal of current in the main line.

7. A generator comprising a field including a frame and pole pieces, an armature, a magnetic by-pass extending partially around the armature from the inner end of each pole piece to a spaced point on the frame, and current controlled means acting upon said by-pass to increase the main field strength proportionately to an increase in current, said by-pass having a restricted section so located that said current controlled means acts to redivert the leakage magnetism across the air gap to the armature but will not substantially reduce the magnetism in said main field upon reversal of current in said current controlled means.

8. A generator comprising a field including a frame and pole piece, an armature, a diverter pole connected with said pole piece and extending partially around the armature and thence towards the frame, and current controlled means for varying the reluctance of said diverter pole.

9. A generator comprising a field including a frame and pole piece, an armature, a diverter pole connected with said pole piece and extending partially around the armature and thence towards the frame, a main circuit, and a coil surrounding said diverter pole and connected in series with the main circuit.

10. A generator comprising a field including a frame and pole pieces, an armature, a diverter pole formed integral with each pole piece and projecting partially around the armature and thence towards the frame, a main circuit, and a coil in series with said main circuit and surrounding each diverter pole.

EDWARD A. HOBART.